May 14, 1968  J. C. CARTER  3,383,116
FACE SEAL
Filed Sept. 30, 1964
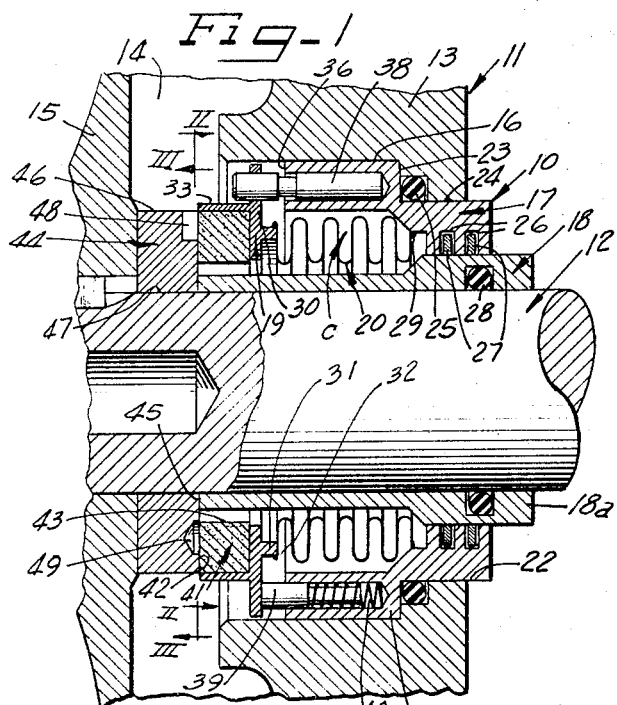
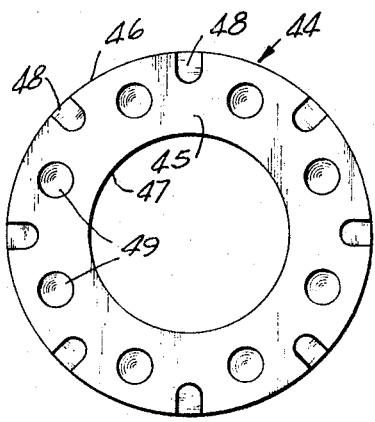
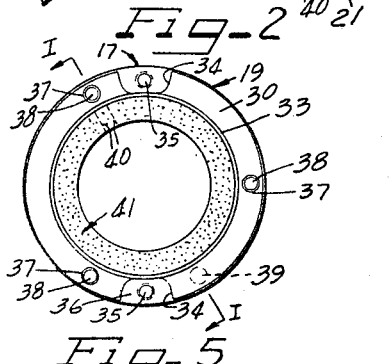
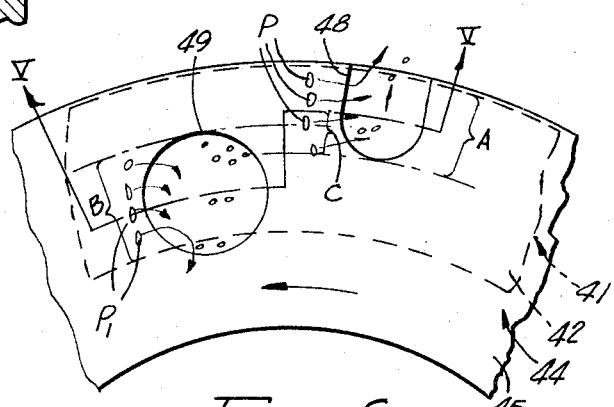
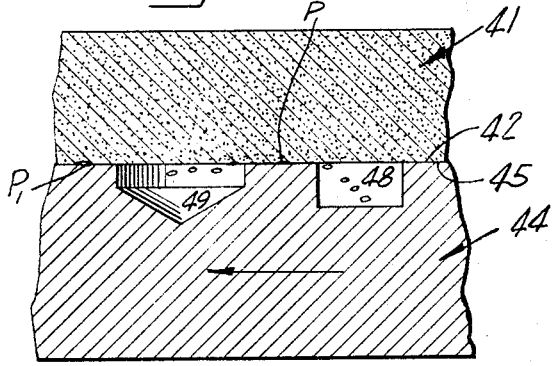
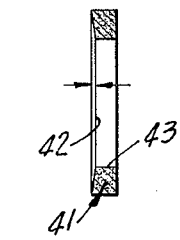
INVENTOR.
JAMES C. CARTER
BY *Hill, Sherman, Meroni, Gross & Simpson* ATTORNEYS United States Patent Office 3,383,116
Patented May 14, 1968

3,383,116
FACE SEAL
James C. Carter, Pasadena, Calif., assignor to The J. C. Carter Company, Costa Mesa, Calif., a corporation of California
Filed Sept. 30, 1964, Ser. No. 400,397
11 Claims. (Cl. 277—96)

This invention relates to seals of the type having relatively rotating parts in face-to-face engagement wherein at least one of the faces is provided with means for removing particles of foreign material from the engaging faces. Specifically this invention relates to face type shaft seals having a hard metal ring riding on a graphitic carbon ring wherein the riding face of the metal ring has circumferentially spaced grit trapping recesses positioned so that each portion of the carbon sealing face will be alternately exposed to metallic contact with the metal ring face and then with the surrounding atmosphere whereby products of wear are rejected immediately upon formation and wear of the mating faces is reduced to a minimum.

The invention will hereinafter be described as embodied in a pump assembly adapted for handling cryogenic fluids because the seal is especially adapted for low temperature application, but it should be understood that the principles of this invention are not limited to any particular seal usage but are generally applicable to all types of face seals.

According to the preferred illustrated embodiment of the invention a graphitic carbon seal ring is secured in a metal carrier that is sealed to one end of a spring bellows. The opposite end of the spring bellows is secured to a housing member carrying guide pins which hold the carrier against rotation. The carbon ring has a radial end face providing the non-rotating or stationary seal face of the assembly. A complementary hard faced ring such as a metal ring is provided to rotate with the shaft and ride on the end face of the carbon ring in sealing engagement therewith. Heretofore it has been customary to provide this hard faced metal ring with a narrow annular nose or rib riding on the carbon ring face under the spring load of the bellows or other spring device. This arrangement places a high unit spring load on the carbon ring soon wearing a groove in the carbon. As long as the bottom of the groove maintains a glazed surface excessive wear is avoided. However, as the groove deepens, the products of wear are retained between the carbon and the metal faces and act as an effective cutting agent greatly increasing the rate of wear of the seal. The present invention eliminates the heretofore used narrow nose or rib on the metal ring and presents a wide flat smooth sealing face to the entire end face of the carbon ring. The unit spring load on the carbon is thus greatly lowered. This wide smooth face of the metal ring has circumferentially spaced recesses therein.

In the preferred arrangement the recesses in the wide flat face of the metal ring take the form of eight milled slots equally spaced around the outer periphery of the metal ring interspersed with eight drilled holes. The slots expose the radial outer portion of the carbon seal face to the surrounding atmosphere while the holes expose the inner peripheral portion of the carbon seal face to the surrounding atmosphere. The carbon seal face is thus alternately exposed to metal seal contact with the wide sealing face of the metal ring and to the surrounding atmosphere. The radial innermost portions of the slots overlap the radial outermost portions of the holes so that the entire seal face of the carbon ring is exposed to the surrounding atmosphere as the metal ring rotates over the carbon ring. At the same time no leakage paths are opened up because the slots in the holes are circumferentially separated by the flat sealing face of the metal ring.

In the preferred embodiment the milled slots of the metal ring are exposed to the pressure side of the seal while the holes are exposed to the unsealed atmosphere. In operation, grit entering the slots will be centrifugally discharged while grit entering the holes will be pressure discharged. However, even though the grit remains in the slots and holes, it will be out of contact with the sealing faces of the metal and carbon rings.

In low temperature usage of the seals of this invention it is preferred to initially dish the sealing face of the carbon ring to offset any tendency of the carbon face to rise in the center to a conical form at very low temperatures. A slight conical depression is therefore machine cut in the carbon sealing face at room temperatures so that at very low temperatures such as are encountered in the handling of cryogenic gases, any swelling tendency of the carbon ring will produce a flat radial surface for mating engagement with the metal ring. Any deviations from a full flat condition are automatically adjusted by cutting action of the relatively sharp edges of the milled slots in the metal ring. As soon as flatness is attained this cutting action stops.

It is then an object of this invention to provide self-cleansing shaft seals.

Another object of the invention is to provide face seals with circumferentially spaced grit traps.

A further object of the invention is to provide a self-cleansing face seal assembly having a hard wear resisting face riding on a soft wearable face and equipped with circumferentially spaced recesses which will trap and release any products of wear developed between the faces.

A still further object of this invention is to provide a shaft seal especially adapted for low temperature usage which will automatically develop a true mating seal face at operating temperatures.

A still further object of the invention is to provide low temperature shaft seals with dished carbon seal rings riding on slotted metal rings which automatically cut the seal face of the carbon ring to compensate against any deviation from flat sealing contact as the assembly approaches low operating temperatures.

Another and specific object of this invention is to provide a seal ring for face type seals having a sealing face provided with circumferentially spaced milled slots opening to the outer periphery of the ring interspersed with drilled holes adapted to be exposed beyond the inner periphery of a mating ring riding on the metal ring.

A still further and specific object of the invention is to provide a seal ring for face type shaft seals with circumferentially spaced grit trapping recesses positioned to alternately expose the seal face of a mating ring to the surrounding atmosphere for rejecting products of wear immediately upon formation.

Other and further objects of this invention will be apparent to those skilled in this art from the following detailed description of the annexed sheet of drawings which, by way of a preferred example only, illustrates one embodiment of the invention.

On the drawings:

FIGURE 1 is a fragmentary cross sectional view, with parts in elevation, of a seal assembly according to this invention mounted in a pump environment and showing the seal section along the section line I—I of FIG. 2.

FIGURE 2 is an end elevational view of the carbon ring and carrier of the seal of FIG. 1 taken generally along the line II—II of FIG. 1.

FIGURE 3 is an end elevational view of the metal seal ring of the assembly and taken generally along the line III—III of FIG. 1.

FIGURE 4 is an enlarged fragmentary, somewhat diagrammatic, end elevational view of the sealing faces of the metal and carbon seal rings of the seals of this invention illustrating the operation of the recesses in the metal ring.

FIGURE 5 is a cross sectional view taken generally along the line V—V of FIG. 4.

FIGURE 6 is a cross sectional view of the carbon seal ring of the assembly of FIGS. 1 and 2 illustrating the dished contour of the sealing end face at room temperatures where the seal is intended for very low temperature usage.

As shown on the drawings:

The seal assembly 10 of FIG. 1 is illustrated as mounted in a pump 11 around a pump shaft 12. The pump 11 includes a housing portion 13 with a pumping chamber 14 receiving fluid from an impeller 15 driven by the shaft 12. The housing has a stepped bore 16 receiving the seal assembly 10.

The seal assembly 10 is composed generally of a metal casing or housing 17 seated in the stepped bore 16, a sleeve 18 extending through the housing 17 and mounted on the shaft 12, a carrier ring 19 freely surrounding the sleeve 18 in front of the housing 17 and a spring metal bellows 20 connecting the carrier to the housing.

The housing 17 includes a large diameter main cylindrical body portion 21 and a reduced diameter cylindrical pilot portion 22. The portion 21 is seated in the large inner end of the bore 16 and is bottomed against a shoulder 23 between this bore portion and a reduced diameter bore portion 24 which receives the pilot end 22. A groove is provided in the shoulder 23 and receives an O-ring seal 25 to insure a tight seal between the housing 17 of the seal assembly 10 and the pump housing 11. The pilot portion 22 of the housing 17 surrounds a thickened end portion 18a of the sleeve and has grooves 26 therein housing backup rings 27 riding on the thickened portion 18a to minimize entrance of foreign matter into the housing. An O-ring seal 28 is provided in a groove in the thickened portion 18a of the sleeve to sealingly and driving connect the sleeve with the shaft.

The main body 21 of the housing 17 provides an open end chamber C backed by the pilot portion and receiving the bellows 20 therein. The inner end of the bellows 20 is sealingly secured as by solder 29 to the pilot end portion 22 of the housing with the inner convolutions of the bellows spaced outwardly from the sleeve 18 and the outer convolutions of the bellows spaced inwardly from the housing portion 21.

The carrier ring 19 has a flat radial main wall portion 30 with a rearwardly extending cylindrical flange 31 sealingly connected to the front end of the bellows 20 as by means of solder 32. The carrier ring 19 is thus sealingly connected to the housing 17 through the bellows 20 and is freely disposed around the sleeve 18 in front of the housing. The carrier ring 19 also has a forwardly projecting cylindrical flange 33 inwardly from the outer periphery thereof and outwardly from the rearwardly extending flange 31.

As shown in FIG. 2 the carrier ring 19 has diametrically opposed cutout portions 34 in the backwall 30 thereof beyond the flange 33. These cutout portions are aligned with tapped holes 35 in the front face 36 of the main body portion 21 of the casing 17. The tapped holes are provided for receiving studs (not shown) that can be used to retract the seal assembly 10 from the housing 11.

The wall 30 of the carrier ring 19 beyond the flange 33 also has three circular apertures 37 therethrough disposed 120° apart and offset from the cutout portions 34 as shown. Each of these apertures 37 receives a pin 38 that is fixedly staked into a hole in the main body portion 21 of the housing 17 as shown in FIG. 1. The three pins 38 thus slidably support the carrier 19 for axial movement toward and away from the end face 36 of the housing.

Diametrically opposite one of the pins 38 there is provided a spring pressed pin 39 slidably mounted in a hole of the body portion 21 and spring loaded against the carrier wall 30 as shown in FIG. 1 by means of a coil spring 40 bottomed in the hole and surrounding the pin. This spring 40 cooperates with the spring bellows 20 to urge the carrier 19 away from the front face 36 of the casing.

As shown in FIG. 2 the pin 39 is diametrically opposite a crimped seam 40 of the bellows 20 and serves to ballance any added spring load caused by the stiffness of the crimped seam thereby insuring uniform spring loading of the carrier ring 19 around its entire circumference.

A graphitic carbon seal ring 41 fits snugly inside of the flange 33 of the carrier ring 19 and is bottomed against the backwall 30 of the carrier ring. This ring 41 is fixedly bonded to the carrier ring and has a flat radial front face 42 exposed across its entire radial width. While the outer periphery of the ring 41 fits snugly within the flange 33, the inner periphery 43 of this carbon ring is spaced from the sleeve 18 and the ring thus has a bore therethrough of larger diameter than the aperture of the carrier ring 19.

A metal seal ring 44 of this invention is mounted on the shaft 12 and clamped between the pump impeller 15 and the sleeve 18 to be driven with the shaft and impeller. This seal ring 44 is preferably composed of case hardened steel and preferably has a chrome plated radial sealing face 45 mating with the end face 42 of the carbon ring 41.

As shown in FIG. 1 the outer periphery 46 of the ring 44 is about flush with the outer periphery of the carbon ring 41 while the inner periphery 47 of the ring 44 extends all the way to the shaft 12 and considerably beyond the inner periphery 43 of the carbon ring. Therefore the face 45 of the metal ring extends across the full radial width of the carbon ring face 42.

As best shown in FIG. 3 the face 45 of the metal ring 44 has eight slots 48 cut therein inwardly from the outer periphery to a radial depth that is somewhat less than half of the radial width of the face 45. These slots 48 as shown in FIG. 1 are open through the outer periphery 46 and have closed rounded bottoms. The slots are preferably formed by a milling cutter to provide relatively sharp edges at the face 45. The eight slots 48 are uniformly spaced circumferentially around the face 45. The ring of slots 48 is interspersed with a ring of eight equally spaced circular recesses or holes 49 with each hole lying midway between the adjacent pair of slots 48. The holes 49 are blind as shown in FIG. 1 and the radial innermost portions of the holes extend beyond the inner periphery 43 of the carbon ring 41 so that the holes are vented to the surrounding atmosphere inside the bellows which atmosphere of course is vented to the outside through the loose backup rings 27. The innermost ends of the slots 48 radially overlap the outermost portions of the holes 49. Thus the outer portion of the carbon ring seal face 42 is vented to pressure in the pump chamber 14 as successive areas of this portion are uncovered by the slots 48 while the inner portion of the carbon ring end face 42 is exposed to atmospheric pressure as successive areas of this portion are exposed to the holes 49. Since however the slots and holes are circumferentially offset no leakage path is opened up between the contacting areas of the stationary carbon ring and the rotating metal ring.

As illustrated in FIG. 4 as the seal face 45 of the rotating metal seal ring 44 rides over the seal face 42 of the stationary carbon seal ring 41 the outer area A of the seal face 42 is exposed to the slots 48 while the inner area B of this seal face 42 is exposed to the holes 49. The portions A and B of the sealing face 42 are overlapped as indicated at C so that the entire face 42 is alternately exposed to sealing metal contact with the metal ring seal face 45 and then with the surrounding atmosphere with the portion A exposed to the pressure area of the volute chamber 14 and the portion B exposed to the atmospheric pressure within the bellows area. Any wear particles designated diagrammatically at P lying within the outer area A between the mating seal faces 42 and 45 of the seal ring will be swept into the slot 48 while such particles P' lying within the area B between the mating faces will be swept into the hole 49 as these areas A and B are exposed to the oncoming slots and holes when the ring 45 is rotated in the counterclockwise direction as illustrated in FIG. 4. The particles entering the slot 48 will be centrifugally discharged through the open periphery of the slot while the particles entering the hole 49 will be discharged into the low pressure area downstream from the sealed off pressure area 14.

FIG. 5 further illustrates the self-cleansing capacity of the seals of this invention since the particles P and P' lying in the interface between the rings 41 and 44 are vented to the slots 48 if they lie in the radially outer portion of the interface and are vented to the holes 49 if they lie in the radial inner portion of this interface. Even though centrifugal force or differential pressure is not sufficient to discharge the particles from the slots or holes they will have no harmful effect on the inner face once they are displaced therefrom. FIG. 5 further illustrates how the sharp edges of the slots and holes have a lapping action on the ring face 42 to prevent the particles from being embedded in the carbon ring.

Since the slots 48 and holes 49 are circumferentially displaced there is always provided a full sealing interface which is never simultaneously exposed to the surrounding atmosphere even though the portion A of the seal face 42 that is exposed to the slots 48 overlaps the portion B that is exposed to the holes 49. Therefore no leakage paths are opened up by the slots and holes.

The grit trapping recesses provided in the metal ring 44 of this invention may take many different forms and shapes without departing from the principles of the invention such as for example providing ports of any desired shape which are alternately vented to the inner and outer peripheries of the carbon ring or to the same periphery of the carbon ring. While it is of course preferred to place these recesses in the hard sealing face of the metal ring, they could be placed in the sealing face of the carbon ring.

As shown in FIG. 6 the sealing face 42 of the carbon ring 41 can be shaped for low temperature application by conically dishing the same inwardly from the outer periphery to the inner periphery 43 of the ring at room temperatures. The depth of the conical dished face 42 between the arrows need only be of the order of .0005 to .0007 inch. This is sufficient to offset against the bulging of the ring face which normally occurs in carbon seal rings which are operated at very low temperatures in the order of minus 200 to minus 400° F. The dished face 42 at room temperatures assumes a flat radial condition illustrated at 42 in FIG. 1 at low temperature operating conditions and even though the operating shape assumed by the face 42 deviates slightly from a flat radial face, the sharp edges of the recesses in the metal ring will lap the face 42 into a true flat condition and as soon as this condition is reached no further cutting action will occur.

The preferred seal assembly of this invention such as in the environment of FIG. 1, has the bellows subject to pump pressure from the pump chamber 14 and has an effective hydraulic area depending on its construction. The effective area of the metal face of the seal ring 44 may be designed to equal this effective hydraulic bellows area to provide a pressure balanced seal.

From the above description it will be therefore understood that this invention provides a face type rotary shaft seal with a self-cleansing construction that rejects products of wear immediately upon formation, assumes an effective sealing surface condition at operating temperatures and provides a much larger contact area at the sealing interface resulting in lower unit pressure loading. All of these features coact to reduce the wear rate of the seal.

I claim as my invention:

1. A self-cleaning rotary face seal comprising a non-rotatable wearable seal ring, a rotatable relatively non-wearable seal ring, said seal rings having wide mating seal faces, means urging said wide faces into sealing riding contact, said face of the rotatable ring having circumferentially spaced recesses alternately vented to the outer and inner peripheries of the non-rotatable ring, and said recesses being positioned to alternately expose radially outer and inner portions of the entire seal face of the non-rotatable ring to the surrounding atmosphere without opening up leakage paths between the mating faces of the rings, whereby grit particles developed by wear or the like are picked up in the recesses and rejected from the seal faces immediately upon formation to minimize seal wear.

2. A self-cleaning face type shaft seal which comprises a graphitic carbon seal ring having an inner periphery of larger diameter than the shaft to be sealed and an outer periphery adapted to be exposed to the space to be sealed with a radial end face between said peripheries, a shaft driven metal seal ring having a radial end face confronting the end face of the carbon seal ring, means urging the radial end faces of the carbon and metal rings into sealing engagement, means holding the carbon ring against rotation, said end face of the metal ring having circumferentially spaced recesses alternately exposed to the inner and outer peripheries of the carbon ring and positioned to alternately expose radially outer and inner portions of the entire end face of the carbon ring to the sealed and unsealed spaces surrounding the rings without opening up leakage paths between the rings, and said recesses being effective to receive grit particles therein from the interface between the carbon and metal ring.

3. A shaft seal assembly which comprises a casing adapted to be sealingly secured in a housing part to be sealed, a sleeve extending through said casing adapted to engage a shaft to be sealed, a spring bellows in the casing surrounding the sleeve and sealingly secured at one end to the casing, a carrier ring surrounding the sleeve in front of the casing and sealingly secured to the opposite end of the spring bellows, means on the casing slidably guiding the carrier ring for axial movement relative to the casing while holding the carrier against rotation, a graphitic carbon seal ring secured in said carrier having a wide radial end face, a hard metal seal ring adjacent the end of said sleeve having an end face for riding on the end face of the carbon ring, circumferentially spaced peripheral slots in the end face of the metal ring exposing the radial outer portion of the carbon ring to the space to be sealed, and circumferentially spaced recesses in said end face of the metal ring interspersed between the slots exposing the radial inner portion of the end face of the carbon ring to the atmosphere.

4. A self-cleansing face type rotary shaft seal which comprises a casing adapted to be sealed in a bore of a housing to be sealed, a sleeve adapted to be fitted on a shaft to be sealed in said housing and projecting through said casing, a carrier ring surrounding said sleeve in front of said casing, a spring metal bellows in said casing sealingly secured at opposite ends to the casing and to the carrier ring and effective to urge the carrier ring away from the casing, pin means on the casing projecting therefrom for slidably mounting the carrier ring on the casing and effective to hold the ring against rotation, a graphitic carbon seal ring secured in said carrier ring having a wide exposed radial end face, a metal seal ring confronting said carbon ring adapted to be driven by the shaft receiving the sleeve for wiping the entire end face of the carbon ring, and recesses in the metal ring positioned to sequentially expose radially outer and inner portions of the entire end face of the carbon ring to the surrounding atmosphere without opening up leakage paths between the mating faces of the rings for removing grit particles from between the rings.

5. A shaft seal assembly which comprises a casing adapted to be sealingly mounted in a housing having a shaft to be sealed, a sleeve extended through the casing adapted to be mounted on the shaft to be sealed, a seal ring carrier in front of the casing surrounding the sleeve, a spring metal bellows in the casing sealingly secured at one end to the casing and at the opposite end to the carrier, said bellows having a seam along the length thereof, pins projecting from the casing through the carrier for slidably mounting the carrier on the casing while accommodating axial movement of the carrier toward and away from the end of the casing, a spring pressed pin slidably mounted in the casing acting on the carrier in diametrically opposed relation to the seam of the bellows for balancing the spring load on the carrier, a graphitic carbon seal ring mounted in the carrier having a wide radial end face, a shaft driven hard metal ring having a radial end face riding on the end face of the carbon ring, a ring of milled slots in the outer peripheral portion of the end face of the metal ring, a ring of blind holes in said end face of the metal ring interspersed between the peripheral slots and exposed to the inner peripherey of the carbon ring, said slots and holes coacting to radially expose radially outer and inner portions of the entire end face of the carbon ring to the surrounding atmosphere without opening up leakage paths between the mating faces of the rings, and said slots having cutting edges adapted to remove any uneveness from the end face of the carbon ring whereby grit particles and the like are picked up in the slots and recesses and immediately rejected from the sealing faces.

6. A self-cleansing rotary seal which comprises first and second seal rings in mated end face relation, one of said seal rings having circumferentially spaced successive recesses therein adapted to alternately expose radial outer and inner portions of the entire seal face of the other ring to the surrounding atmosphere without opening up leakage paths between the mating faces of the rings, and means urging said mating faces into sealing engagement whereby grit particles developed by wear or the like are picked up in the recesses and rejected from the mating faces immediately upon formation.

7. A rotary shaft seal adapted for low temperature usage which comprises a sleeve adapted to be mounted on a shaft for rotation therewith, a casing surrounding the sleeve and having a chamber therein, said casing having a plurality of slots exposed to the sleeve beyond said chamber, backup rings in said slots riding on the sleeve, a carrier ring loosely embracing the sleeve in front of said casing, a spring metal bellows in the chamber of the casing secured at one end to the carrier ring and at the other end to the casing, guide pins secured in the casing slidably supporting the carrier ring in front of the casing, a graphitic carbon seal ring mounted in the carrier having an exposed radial end face, a hard metal shaft driven seal ring confronting said carbon ring and having an end face riding on the exposed face of the carbon ring, a plurality of mill cut slots in the metal ring extending inwardly from the outer periphery thereof and confronting the radial outer portion of the exposed end face of the carbon ring to sequentially vent said portion to the space being sealed, a ring of blind recesses in the metal ring exposed to the radial inner peripheral portion of the carbon ring for venting said portion to the space within the bellows, said recesses being interspersed between the slots, and said slots having sharp edges effective for lapping the end face of the carbon ring into full seated engagement with the metal ring at the operating temperature of the assembly.

8. A shaft seal assembly which comprises a rotatable relatively non-wearable seal ring, a non-rotatable wearable seal ring, said seal rings having confronting seal faces, the seal face of the wearable seal ring being conically dished at temperatures above the operating temperature and effective for bulging into a straight radial position at the operating temperature, and said rotatable ring having recesses effective to trap grit particles developed between the confronting faces of the rings with the edges of some of the recesses being effective to cut irregularities from the initially dished face of the wearable ring.

9. A seal ring for face type seals which comprises a hard non-wearable metal ring having a wide radial end face, a first ring of circumferentially spaced slots in said end face vented to the outer periphery of the ring, and a second ring of blind holes in said end face interspersed between said slots, said rings of slots and holes being radially overlapped and circumferentially separated.

10. A metal seal ring for face type seals which comprises a ring having a wide radial end face, eight slots mill cut into said end face inwardly from the outer periphery of the ring to a depth less than half the radial width of the end face, eight blind circular recesses cut into said end face in equally spaced relation between the slots and extending radially inward from the radial inner ends of the slots.

11. A face seal member which comprises a ring having a seal face adapted to ride on a mating face, and circumferentially spaced grit trapping successive recesses in said seal face alternately vented to the inner and outer peripheries of the mating face and positioned to alternately expose the radially outer and inner portions of the mating face to the surrounding atmosphere.

References Cited

UNITED STATES PATENTS

| | | | |
|---|---|---|---|
| 2,247,505 | 7/1941 | Kohler | 277—yu |
| 2,949,321 | 8/1960 | Tracy | 277—96 |
| 2,995,390 | 8/1961 | Gardner | 277—96 |
| 3,100,647 | 8/1963 | Lee et al. | 277—96 |
| 3,186,723 | 6/1965 | Wagner | 277—96 |

FOREIGN PATENTS 1,023,186  12/1952  France.

LAVERNE D. GEIGER, *Primary Examiner.*

D. MASSENBERG, *Assistant Examiner.*